United States Patent [19]
Hahn

[11] Patent Number: 5,566,954
[45] Date of Patent: Oct. 22, 1996

[54] FAN SHROUD ATTACHED AIR DEFLECTING SEAL

[75] Inventor: Thomas R. Hahn, Northville, Mich.

[73] Assignee: Hahn Elastomer Corporation, Plymouth, Mich.

[21] Appl. No.: 149,186

[22] Filed: Nov. 8, 1993

[51] Int. Cl.⁶ .................... F16J 15/02; F01P 5/06
[52] U.S. Cl. .............. 277/184; 277/186; 123/41.49; 49/490.1
[58] Field of Search ................... 277/178, 183, 277/184, 186; 416/169 A, 179, 189; 123/41.49; 165/149, 95, 99; 296/93; 49/490.1

[56] References Cited

U.S. PATENT DOCUMENTS

| | | | |
|---|---|---|---|
| 2,668,523 | 2/1954 | Lamb | 123/41.49 |
| 4,193,605 | 3/1980 | Josephson | 277/184 |
| 4,447,065 | 5/1984 | Dupuy et al. | 277/184 |
| 4,472,469 | 9/1984 | Thies | 49/490.1 X |
| 4,488,518 | 12/1984 | Wohlfarth | 123/41.49 |
| 4,522,160 | 6/1985 | Speers et al. | 123/41.49 |
| 4,541,369 | 9/1985 | Ruhl | 123/41.49 |
| 4,690,412 | 9/1987 | Tuckley et al. | 277/184 |
| 4,781,961 | 11/1988 | Weaver et al. | 49/490.1 X |
| 4,931,493 | 6/1990 | Weber | |
| 4,950,019 | 8/1990 | Gross | 296/93 |
| 5,108,146 | 4/1992 | Sheppard | 296/93 X |
| 5,174,066 | 12/1992 | Dupuy et al. | |
| 5,251,954 | 10/1993 | Vande Kopple et al. | |
| 5,317,835 | 6/1994 | Dupuy et al. | |
| 5,338,087 | 8/1994 | Gross et al. | 269/93 X |

Primary Examiner—Scott W. Cummings
Attorney, Agent, or Firm—Harness, Dickey & Pierce, P.L.C.

[57] ABSTRACT

An air flow directing seal with integrally formed attachment member for attaching a seal to an automotive fan shroud is disclosed. The seal further includes an integrally formed flag portion which directs the flow of air from the radiator to the fan shroud. The attachment member includes a semi-rigid C-shaped channel that is made of a talc filled polypropylene material and further includes flexible resilient teeth integral with the inside surfaces of the C-shaped channel which aid in gripping the seal to a linear edge of the automotive fan shroud. The seal is made by a dual extrusion process whereby two types of thermoplastic materials are utilized having various physical properties in accordance with the desired specification. The flexible resilient teeth and the flag are made of the same thermoplastic rubber and the C-shaped channel is made of polypropylene during the same extrusion process. Thus, the teeth and the flag extend the entire length of the seal. The seal may be easily snapped to the shroud wherein the resilient teeth firmly grips the shroud which causes the seal to be secured to the shroud.

16 Claims, 1 Drawing Sheet

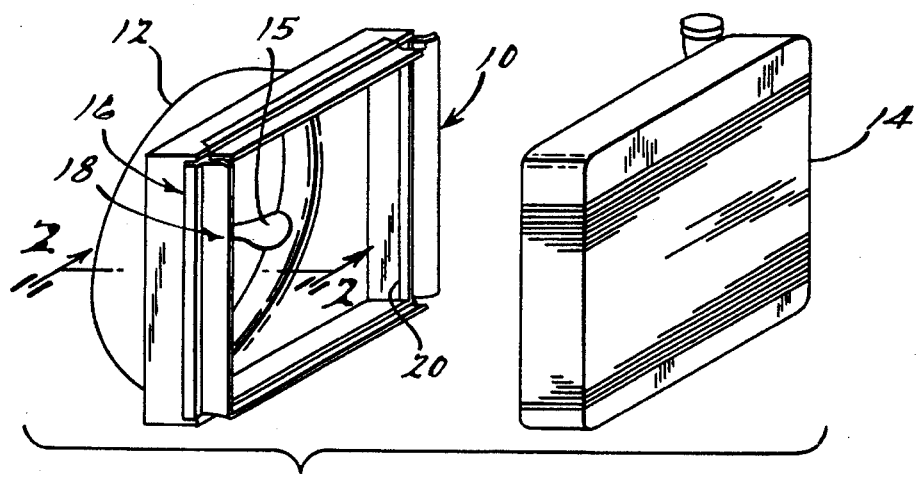
FIG. 1.
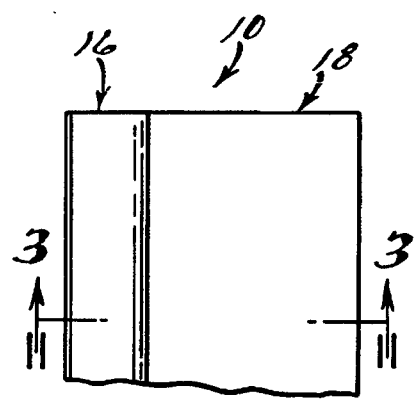
FIG. 2.
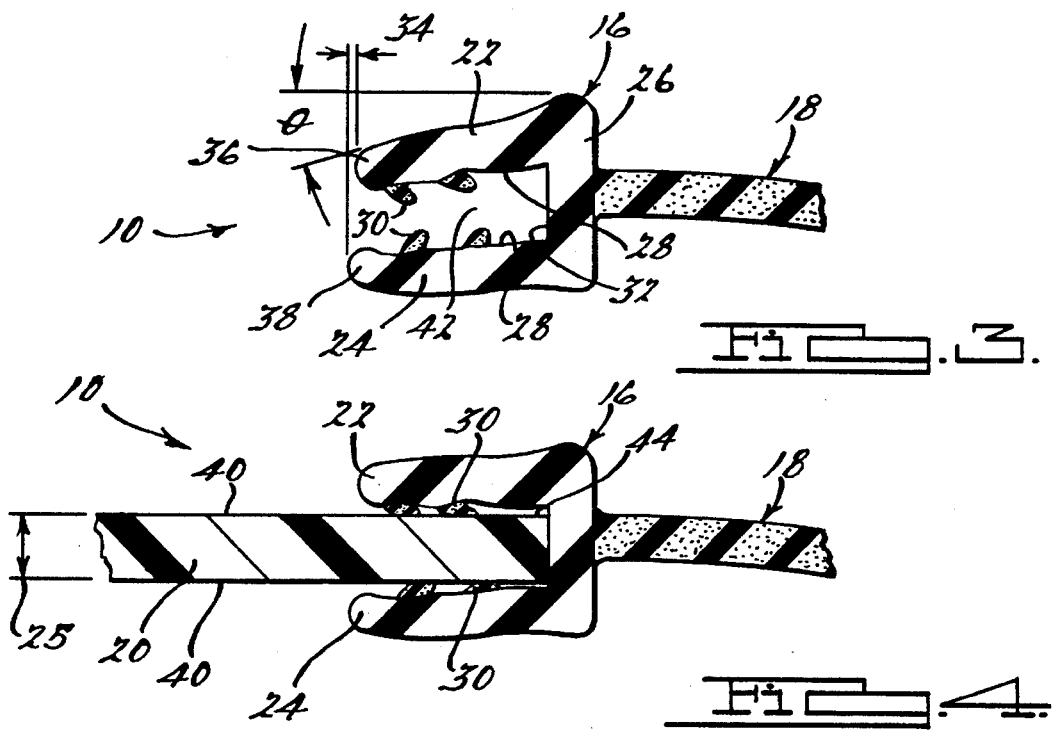
FIG. 3.
FIG. 4.

FAN SHROUD ATTACHED AIR DEFLECTING SEAL

BACKGROUND OF THE INVENTION

1. Technical Field

The present invention relates generally to extruded sealing members to be used with automotive fan shrouds for the purpose of creating a seal between the radiator and the fan shroud. More particularly, an improved sealing member is disclosed having a C-shaped channel with flexible inner teeth for engaging the fan shroud and a flexible deflector flap connected to the C-shape channel for directing the air flow generated by the fan blade.

2. Discussion

In order to maintain proper operating temperature of an automotive engine, the radiator must be properly cooled by forcing air across the radiator coils which causes the coolant located therein to be cooled. To assist in the cooling of the radiator, a fan is mounted to a fan shroud which, when the fan is activated, large volumes of air is drawn across the radiator's coils. A sealed air flow area is defined by the seal, the front edge of the fan shroud and the rear portion of the radiator. By defining a sealed area between the fan shroud and the radiator, the fan becomes more efficient at pulling the air across the radiator's coils. Thus, it is important to provide a seal that will eliminate air gaps and hold its form for the life of the vehicle.

It is well known in the art to attach a seal member to the edge or perimeter of the fan shroud by using various fastener means. A commonly known method of attaching the sealing member to the fan shroud includes screwing the seal to the edge of the fan shroud. Also, it is well known to provide a sealing member that has metal clips permanently molded within a section of the seal. Such a design allows the sealing member to be snapped to the edge of the fan shroud. The problem with the above-mentioned sealing members is that they require additional fasteners to be employed in order to secure the sealing member to the fan shroud. Moreover, these designs do not provide a continuous fastening surface that extends the entire length of the seal. Also, the usage of this type of fastener requires the production line worker to take additional steps in order to properly fasten the sealing member to the fan shroud. Furthermore, because of these designs, additional costs are involved due to the usage of additional fasteners which are necessary in order to secure the sealing member to the fan shroud.

Thus, while the above-mentioned conventional sealing members may be satisfactory for their intended purpose, a continued need exists to provide a seal that has a fastening means that extends the entire length of the seal, to decrease the per unit cost of the seal, to stream-line the assembly process on the production line, and to improve the quality of the sealing member so that it does not fatigue during the life of the automobile.

SUMMARY OF THE INVENTION

It is an object of the present invention to provide a unique extruded sealing member that employs integrally molded fastening means and therefore does not require additional fasteners to be employed along with the sealing member in order to assure that the sealing member will stay secured to the fan shroud.

It is another object of the present invention to provide a unique sealing member that has an integrally molded fastening means and deflector means that are created during an extrusion process.

The present invention provides as one of its aspects, an extruded air flow directing seal for an automotive fan shroud, the fan shroud having linear edges for receiving the seal. The seal is comprised of a semi-rigid C-shape channel that has two spaced-apart flanges connected by a common section, each of the flanges including interior surfaces and the common section having an exterior surface. The seal further comprises resilient rubber teeth that are integral with the interior surfaces which allow the seal to be firmly attached to the linear edges of the automotive fan shroud. And finally, a resilient rubber deflector is integral with the exterior surface of the C-shape channel and is provided for sealing off an area between the fan shroud and the radiator and further directs the air from the radiator to the fan shroud as the fan pulls the air across the radiator's coils. The seal provides a smooth continuous flow path for the air to be directed from the radiator to the fan shroud.

The following specification taken in conjunction with the accompanying drawings and appended claims, other objects, features and advantages of the present invention will become apparent to those skilled in the art.

BRIEF DESCRIPTION OF THE DRAWINGS

FIG. 1 illustrates a conventional automotive radiator and fan shroud with the novel extruded sealing member attached to the fan shroud;

FIG. 2 illustrates a side elevational view of a portion of the extruded sealing member taken from the perspective of line 2—2;

FIG. 3 is a sectional view of the extruded sealing member taken along line 3—3 of FIG. 2; and FIG. 4 is the sectional view of the FIG. 3 sealing member with an edge of the automotive fan shroud inserted within the channel of the sealing member.

DETAILED DESCRIPTION OF THE PREFERRED EMBODIMENTS

In general, the present invention is directed to improvements in extruded sealing members that may be employed with automotive fan shrouds. More particularly, the present invention discloses a unique extruded sealing member that requires no external fastener means to be used other than that which is permanently molded as a part of the seal during the extrusion molding process. The seal is made of two different plastic materials that allow the seal to meet the required automotive specifications. This unique design provides for a low cost per unit sealing member that can be easily installed in a minimal amount of time by the production worker. It is to be understood that the following detailed description of the preferred embodiments is merely exemplary in nature and is in no way intended to limit the invention, its application or uses.

With particular reference to FIG. 1, the extruded sealing member 10 is shown in its operative environment where it is attached to an automotive fan shroud 12 and is located between the fan shroud 12 and a standard automotive radiator 14. Thus, the seal 10 acts as an air deflector and is shown operably situated between the fan shroud 12 and the radiator 14 for directing the air pulled by the fan blade 15 from the coils of the radiator 14 to and through the fan shroud 12. The fan shroud 12 has a circular portion which blends into an integrally box-shaped portion that has substantially linear edges 20 which are operable to receive the seal 10. Together, seal 10 and the rear edge of the radiator 14 all define a sealed area in which air may flow from the radiator to and through the fan. It will be appreciated that the seal 10 may have applications elsewhere beyond that which is specifically referred to herein. For example, a domestic refrigerator uses seals that may be readily replaced by the seal 10 discussed herein.

The seal 10 has a C-shaped channel portion 16 and a rubber flag portion 18 as illustrated in FIGS. 1 through 3. Referring specifically to FIG. 3, the C-shaped channel 16 includes a pair of outwardly extending flanges 22 and 24 that are integrally molded with a main body or common section 26. The outwardly extending deflector or flag portion 18 is integrally molded to the main portion 26 and is the structural portion of the seal 10 that enhances the directing of air flow across the radiator 14. The one flange 22 is extruded with an offset angle θ which is preferably approximately 45°. This angular Offset of the flange 22 tends to naturally bias the inner surfaces 28 and the teeth 30 against the linear edges 20 of the fan shroud. This natural biasing action also tends to cause the teeth 30 to naturally grip the edges 20 of the fan shroud so that the seal 10 remains firmly secured to the fan shroud.

The teeth 30 are integrally molded with the interior surface 28 of the flanges during the extrusion process and are naturally orientated towards a rear surface 32 to enhance the seal's ability to grip to the fan shroud 12. The teeth 30 also extend the entire linear distance of each Seal and thus, define a continuous fastening means which engages the linear edges 20 of the fan shroud. This is an improvement over previous fan shroud seals that only provides a fastener every inch or so along the perimeter of the fan shroud; thus, providing a number of individual stress areas that can wear, work harden, and fail over the life of the seal. Accordingly, these older designs are much more susceptible to failure when subjected to the heat and the vibration caused by the automotive engine.

An additional feature of the seal 10 is provided whereby an offset 34 is located between the outer edges 36 and 38 of flanges 22 and 24, respectively, as clearly illustrated in FIG. 3. The offset 34 is preferably about 1/16 inches and is provided for enhancing the clamping force of the C-channel upon the fan shroud 20. It will be appreciated that the offset 34 can be of varying distances. Thus, the combination of the offset ends, the angular offset of flange 22, and the inwardly oriented resilient teeth 30, all provide a strong clamping force which allows the channel 16 to be secured to the linear edge of the fan shroud without any additional use of fasteners. As a result of this design, the seal may be easily assembled on the production line and, in addition, this design offers cost advantages over previous designs.

The sealing member 10 is further unique in design in that its components are made up of two different types of materials. The resilient flag 18 and the resilient teeth 30 are preferably made of a thermoplastic rubber such as "SANTOPRENE" which is a registered trademark owned by Advanced Elastomers Corp. It is preferred that the flag 18 and the teeth 30 be made of a flexible and resilient material having a flexural modulus of at least about 2,680 pounds per square inch, a Durometer hardness of about 65 shore A, and a maximum compression set of about 212° F. at 36% or less. It will be appreciated that other types of materials can be utilized as along as such materials are operable to perform in accordance with these and any other required automobile manufacturer's specifications.

The remaining component, the C-shaped channel 16, is preferably made with 20% talc filled polypropylene, it could also be made of polyvinyl chloride or the like. Furthermore, the C-shaped channel 16 is semi-rigid and may include various materials such as, but not limited to, polymers which may contain conventional additives, for example, without limitation to, fillers, reinforcing materials, colorants, antioxidizers, fire retardants, or the like. It is preferred that the channel 16 be made of material having a minimal flexural modulus of about 400,000 pounds per square inch, a compressive strength of about 5,000 pounds per square inch, and a Durometer hardness of about 95 Shore A or greater. It will be appreciated that other types of materials may be employed other than those set out herein however, such materials should have physical properties comparable to those set out herein. Also, it is important that the materials used to make the seal have compatible thermal coefficients in order to ensure longevity of the seal as well as to maximize its ability to function under normal operating conditions.

Referring to FIG. 4, the linear edge 20 of the fan shroud 12 is shown inserted within the channel 16 and the flanges 22 and 24 are shown spread apart, or opened, in order to accommodate the thickness 25 of the linear edge 20 of the fan shroud. The resilient teeth 30 are shown pressed against the outer surface 40 of the linear edges 20 of the fan shroud 12 and the teeth 30 firmly grip against the outer surface 40 to prevent the seal 10 from slipping off of the fan shroud 12. Once the seal 10 is locked into position with the edge 20 of the fan shroud, the seal should remain permanently secured to the fan shroud 12 unless pulled off by tugging on the flag 18. The seal may be reinserted or reused on another fan shroud as long as it is attached to the linear edge portion of a shroud having a compatible thickness. It will be appreciated that the width of the opening 42 of the channel 16 may be varied in accordance with any desirable design by modifying the die of the extrusion machine. Nonetheless, it is preferred that an opening 42 be provided that has a width of sufficient dimension to define a clearance area 44 once the edge 20 has been inserted within the opening 42.

The seal 10 is produced by an extruded molding process whereby dual feed screws are used to deliver the two types of molten plastic to and through a die that produces an extruded sealing member shaped like that illustrated in FIG. 3. The resulting seal 10 has a semi-rigid C-shaped channel with integrally molded teeth and a flag portion that are resilient. It will be appreciated that the seal could be modified to include other combinations of materials including, for example, a different type of material for the channel 16, flag 18 and the teeth 30.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. An air flow directing seal, the seal comprising:

a semi-rigid C-shaped channel having two spaced-apart flanges connected by a common section, each of said flanges including interior surfaces, said common section having an exterior surface;

resilient teeth coextensive with said interior surfaces; and a resilient deflector integral With said exterior surface, the deflector being substantially parallel to one of said spaced-apart flanges and substantially perpendicular to the common section.

2. The sealing member according to claim 1, wherein said seal is made of at least one polymer.

3. The sealing member according to claim 1, wherein said channel and said resilient deflector are made of different materials.

4. The sealing member according to claim 1, wherein said seal is formed by an extrusion process wherein said channel is made of talc filled polypropylene and said resilient teeth and said resilient deflector are made of a thermoplastic rubber.

5. The seal according to claim 1, wherein, one of said flanges is angularly inset relative to the other of said flanges.

6. The seal according to claim 1, wherein each of said flanges includes an outer edge, said edges being non-parallel with one another in a lateral cross section.

7. The seal according to claim 1, wherein said resilient teeth are operative to continuously secure the seal to a linear edge of a shroud.

8. The seal according to claim 1, wherein said spaced apart flanges are angularly offset in a direction to bias said flanges toward a linear edge of a shroud.

9. The seal according to claim 1, wherein each of said spaced-apart flanges include outer edges that are converging in a cross sectional view.

10. The seal according to claim 1, wherein said resilient teeth and said resilient deflector are made of the same material and said channel is made of a different material.

11. The seal according to claim 1, wherein said resilient deflector is a flexible rubber strip extending a length of the channel.

12. The seal according to claim 1, wherein said resilient teeth includes a leading edge and a trailing edge, the leading edge being integral with said interior surface, the trailing edge oriented towards said common section.

13. The seal according to claim 1, wherein said channel is made of material having a flexural modulus of at least about 400,000 pounds per square inch and said resilient teeth and said resilient deflector is made of material having a flexural modulus of at least about 2,680 pounds per square inch.

14. The seal according to claim 1, wherein said channel and teeth are co-extruded, said channel is made of one type of material and said teeth are made of another type of material.

15. The seal according to claim 1, wherein said channel is made of material having a Durometer hardness of about 95 Shore A or greater and said teeth and deflector are made of a material having a hardness less than that of the channel.

16. The seal according to claim 1, wherein said teeth, deflector and channel are integrally molded.

\* \* \* \* \*